United States Patent
Rahimi et al.

(10) Patent No.: US 11,034,851 B2
(45) Date of Patent: Jun. 15, 2021

(54) INK SETS

(71) Applicant: Hewlett-Packard Development Company, L.P., Spring, TX (US)

(72) Inventors: Alireza Rahimi, San Diego, CA (US); George Sarkisian, San Diego, CA (US); Jason R. Arbeiter, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 65 days.

(21) Appl. No.: 16/462,792

(22) PCT Filed: Apr. 11, 2017

(86) PCT No.: PCT/US2017/026997
§ 371 (c)(1),
(2) Date: May 21, 2019

(87) PCT Pub. No.: WO2018/190806
PCT Pub. Date: Oct. 18, 2018

(65) Prior Publication Data
US 2019/0315992 A1    Oct. 17, 2019

(51) Int. Cl.
| | | |
|---|---|---|
| C09D 11/54 | (2014.01) |
| B41M 5/00 | (2006.01) |
| C09D 11/033 | (2014.01) |
| C09D 11/037 | (2014.01) |
| C09D 11/102 | (2014.01) |
| C09D 11/322 | (2014.01) |
| C09D 11/328 | (2014.01) |
| C09D 11/38 | (2014.01) |
| C09D 11/40 | (2014.01) |

(52) U.S. Cl.
CPC .......... C09D 11/54 (2013.01); B41M 5/0023 (2013.01); C09D 11/033 (2013.01); C09D 11/037 (2013.01); C09D 11/102 (2013.01); C09D 11/322 (2013.01); C09D 11/328 (2013.01); C09D 11/38 (2013.01); C09D 11/40 (2013.01)

(58) Field of Classification Search
CPC .... B41M 5/0023; C09D 11/54; C09D 11/033; C09D 11/037; C09D 11/102; C09D 11/322; C09D 11/328; C09D 11/38; C09D 11/40
See application file for complete search history.

(56) References Cited

U.S. PATENT DOCUMENTS

| | | |
|---|---|---|
| 5,913,971 A | 6/1999 | Fujimatsu et al. |
| 7,884,953 B1 | 2/2011 | Willcocks et al. |
| 2002/0044187 A1 | 4/2002 | Koitabashi et al. |
| 2005/0024458 A1 | 2/2005 | Sanada et al. |
| 2007/0225401 A1* | 9/2007 | Sarkisian ............ C09D 11/30 523/160 |
| 2013/0261219 A1* | 10/2013 | Bogale ............... C09D 11/38 523/122 |
| 2015/0015650 A1 | 1/2015 | Landa et al. |
| 2015/0210103 A1* | 7/2015 | Weihs ............. C04B 38/0051 101/395 |
| 2017/0022379 A1 | 1/2017 | Loccufier et al. |

FOREIGN PATENT DOCUMENTS

| | | |
|---|---|---|
| EP | 0712735 | 5/1996 |
| WO | 2009143233 | 11/2009 |
| WO | 2012105949 | 8/2012 |
| WO | 2015112115 | 7/2015 |
| WO | 2015116028 | 8/2015 |

OTHER PUBLICATIONS

International Search Report dated Dec. 28, 2017 for PCT/US2017/026997, Applicant Hewlett-Packard Development Company, L.P.

\* cited by examiner

*Primary Examiner* — Patrick D Niland
(74) *Attorney, Agent, or Firm* — Thorpe North & Western LLP

(57) ABSTRACT

The present disclosure is drawn to an ink set, which can include an ink composition and a fixer composition. The ink composition can include from 2 wt % to 8 wt % pigment, from 0.1 wt % to 0.5 wt % dye, from 2 wt % to 10 wt % polyurethane, and an aqueous ink vehicle. The fixer composition can include from 3 wt % to 15 wt % divalent metal salt, and an aqueous fixer vehicle.

16 Claims, 2 Drawing Sheets

INK SETS

BACKGROUND

Inkjet technology has expanded its application to high-speed, commercial and/or industrial printing, in addition to home and office usage. This technology is a non-impact printing method in which an electronic signal controls and directs droplets or a stream of ink for deposition on a wide variety of substrates. Current inkjet printing technology involves forcing the ink drops through small nozzles by thermal ejection or piezoelectric pressure or oscillation onto the surface of a media. Though inkjet printing is versatile, with certain types of media, there can be challenges related to inkjet or digital printing technology.

BRIEF DESCRIPTION OF THE DRAWINGS

Additional features and advantages of the disclosure will be apparent from the detailed description that follows, which taken in conjunction with the accompanying drawings illustrate, by way of example, features of the present disclosure.

Figure 1:
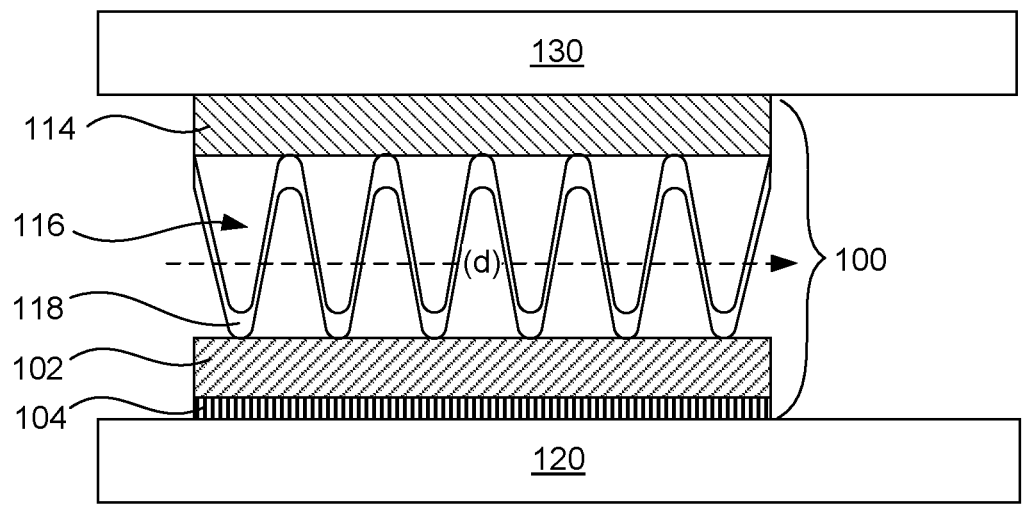
FIG. 1 depicts an example cross-sectional schematic view of a corrugated print medium in a preparative state in accordance with the present disclosure.

Reference will now be made to several examples that are illustrated herein, and specific language will be used herein to describe the same. It will nevertheless be understood that no limitation of the scope of the disclosure is thereby intended by the examples.

DETAILED DESCRIPTION

With printed packaging, particularly where corrugation is used, achieving and retaining acceptable print quality using inkjet printing technologies can be difficult. Outside of inkjet technology, packaging prints have traditionally been prepared using other printing techniques, such as lithographic sheet printing with a lamination process to generate a corrugated board or flexographic printing that subsequently goes through a corrugation device or corrugator. Lithographic prints can be high quality but the lamination process can be slow and with narrower media widths. Flexographic printing with subsequent corrugation can provide faster speeds and can provide wider corrugator widths. However, the process of corrugation used with flexographic printing can be very harsh, and thus, is not easily transferable to some other types of printing, e.g., the corrugation process can include dragging a print surface over hot plates with temperatures ranging from about 300° F. to 400° F.

Because of the harsh conditions used to prepare corrugated print media, if a coating layer or ink-receiving layer is used at a surface of the corrugated print medium for receiving ink, this relatively fragile layer can become burnished during the manufacturing process. For example, a printable side of a corrugated print medium can be subjected to high pressure and temperature during manufacturing, particularly over peaks of an underlying corrugated flute where the media rubs with greater pressure against the media handling equipment. Though burnishing can be somewhat random and unpredictable, when it occurs, it tends to occur at a greater intensity over these peaks, and less so elsewhere on the ink-receiving layer. With this non-uniform surface, upon printing, a non-uniform absorption of aqueous ink tends to occur across the surface. For example, inks that may be readily absorbable in a coating layer with intact ink-receiving capillaries may not be easily absorbed in the burnished areas. This may be partly because the corrugation process, particularly above the peaks of the corrugated flute, can receive more pressure, and thus, coating layer capillaries may become damaged or crushed. As a result, in the burnished areas, aqueous pigmented inks in particular tend to migrate away from the burnishment, even when using a fixer composition to crash the pigment.

Thus, in accordance with examples of the present disclosure, an ink set can be prepared that is generally suitable for use with coated corrugated print media, and can also mask burnished areas, leaving a more uniform looking print. More specifically, the ink can include a unique dye and pigment combination of colorants that may not only provide high image quality on non-burnished areas of ink-receiving layer, but can also mask burnished areas, leaving a more uniform look to the print as a whole. For example, the white spaces (or other color spaces left by the underlying media that does not readily accept pigmented ink) can be masked by the dye in the ink, which does not migrate away from the burnished area. This is partly because the dyes used herein do not necessarily use the capillaries for print media ink absorption, and thus, because both colorants are present, a print can be prepared that has a more uniform and undamaged appearance. Furthermore, because a pigment and a fixer are also used, these components can also provide enough durability suitable for packaging application.

In accordance with the present disclosure, an ink set can include from 2 wt % to 8 wt % pigment, from 0.1 wt % to 0.5 wt % dye, from 2 wt % to 10 wt % polyurethane, and an aqueous ink vehicle. The ink set can also include a fixer composition, including from 3 wt % to 15 wt % of a fixing agent, e.g., a divalent metal salt, and an aqueous fixer vehicle.

The dye can be selected to have good water fastness and durability, but also can be selected so that it spreads within burnished areas of the coated corrugated print medium. A dye that does not crash, or does not crash significantly, with the fixer composition can be particularly useful. Thus, in one example, the dye may have no carboxylic acid groups. Alternatively, if a carboxylic acid group is present on the dye, only one carboxylic acid group per dye molecule is present in one example. The term "carboxylic acid group" includes both the protonated acid as well as the salt thereof, e.g., the carboxylic acid or the carboxylate.

In further detail regarding the dye, the dye may be partially water soluble, e.g., having a solubility from 1 to 30 g in 100 mL of water at 25° C., from 1 to 20 g in 100 mL of water at 25° C., or from 2 to 10 g in 100 mL water at 25° C. Notably, dyes that are very highly water soluble, such as those sometimes referred to as "infinitely" water soluble, may not be as suitable for use, even at the low concentrations because of excessive bleed. Suitable low concentration ranges for the dyes that do work well in the ink can be from 0.1 wt % to 0.5 wt %, from 0.1 wt % to 0.4 wt %, from 0.1 wt % to 0.3 wt %, from 0.2 wt % to 0.5 wt %, from 0.2 wt % to 0.4 wt %, or from 0.2 wt % to 0.3 wt %. Thus, partial solubility and a low weight percent range, in some examples, can contribute to the water fastness of the dye on the packaging media, even in the burnished areas. In one specific example, the pigment can be present in the ink composition at from 2 wt % to 5 wt %, and the dye can be the same color as the pigment and can be present in the ink at from 0.2 wt % and 0.4 wt %.

Specific examples of dyes that can be used include may Projet™ dyes from FujiFilm, including Projet™ Fast Black 2 Liquid, Projet™ Cyan 1 Special, Projet™ Cyan 854 Liquid, Projet™ Magenta APD 1100, or Projet™ Fast Magenta 2 HI-NA, to name a few. Another dye that can be used includes Direct Black 168 liquid. Each of these dyes has good masking properties and can provide a good crisp image quality with little to no feathering or bleeding at burnished areas. Other dyes that can be used include Food Black 2 TMA Liquid, JPD Cyan H-CB Liquid, and Acid Red 289 TMA. These three dyes provide acceptable masking properties, but are not as effective with respect to image quality and spreading control. These dyes include no more than 1 carboxylic acid group, e.g., 0 or 1 per dye molecule, and/or have a water solubility from 1 to 30 g in 100 mL of water at 25° C. More than 1 carboxylic acid group on a dye molecule tends to crash with the aqueous fixer composition and thus, does not work as well at masking burnished areas of the corrugated print medium.

Example pigments that can be used include anionically dispersed pigment, dispersed with an anionic polymer, for example. Thus, the term "pigment" may generally include organic or inorganic pigment colorants, magnetic particles, aluminas, silicas, and/or other ceramics, organo-metallics, metallic particulates, or other opaque particles that introduce color to the aqueous ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60. Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50. Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45. Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42. Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I.

Pigment Orange 38, C.I. Pigment Orange 40, C.I. Pigment Orange 43, and C.I. Pigment Orange 66.gms.

As mentioned, the inks may also include a polyurethane, such as those formulated to crash with a fixing agent in the fixer composition. The term polyurethane or polyurethane binder includes both traditional polyurethanes as well as polyureas. The polyurethane can include a curable double bond, polyurethane-graph polyol, etc. The polyurethane can be a graph polyol, such as Pluracol® (available from BASF). In another example, the polyurethane can include an acrylic functional group. The polyurethane can also have a weight average molecular weight ranging from 10,000 Mw to 100,000 Mw. In another example, the polyurethane can have a weight average molecular weight ranging from 20,000 Mw to 50,000 Mw. In yet another example, the binder can be a polyurethane having a curable double bond. Other polyurethanes can likewise be prepared or obtained for use in accordance with examples of the present disclosure.

The ink vehicle, in one example, can include a polyol co-solvent, such as tetraethylene glycol, glycerol, tripropylene glycol, Dowanol® TPM, triethylene glycol, dipropylene glycol, or the like.

Turning briefly to the fixer composition, there may be an aqueous fixer vehicle, which may be predominantly water, but can include other liquid vehicle components often present inks. However, the fixer composition also includes a fixing agent. In the present disclosure, the fixing agent can be a divalent metal salt, as mentioned calcium propionate, calcium nitrate, calcium sulfate, magnesium propionate, magnesium nitrate, or magnesium sulfate. As also mentioned, the fixing agent can be present in the fixer composition at from 3 wt % to 15 wt %, for example. These particular fixing agents can act to crash out both the pigment and the polyurethane that is present in the aqueous ink composition.

In another example, a printing system can include an ink composition, a fixer composition, and a corrugated print medium. The ink composition can include from 2 wt % to 8 wt % pigment, from 0.1 wt % to 0.5 wt % dye, from 2 wt % to 10 wt % polyurethane, and an aqueous ink vehicle. The fixer composition can include a fixing agent present at from 3 wt % to 15 wt %, and an aqueous fixer vehicle. The fixing agent can be a divalent metal salt, e.g., calcium propionate, calcium nitrate, calcium sulfate, magnesium propionate, magnesium nitrate, or magnesium sulfate, for example. The corrugated print medium can include a corrugated flute with peaks that support a printing substrate that is coated with an ink-receiving layer.

In the ink composition, the dye can be a partially water soluble dye having a solubility from 1 g to 30 g per 100 mL of water at 25° C. The dye, in one example, may have no carboxylic acid groups, and in another example, may only have one carboxylic acid group. In one example, the dye can be present in the ink composition at from 0.2 wt % to 0.4 wt %, and the pigment can be present in the ink composition at from 2 wt % to 5 wt %. Other weight ranges for the dyes and pigments, and various combinations thereof, can be as described elsewhere herein.

In the fixer composition, the divalent metal salt may be calcium propionate, calcium nitrate, calcium sulfate, magnesium propionate, magnesium nitrate, or magnesium sulfate, for example. Other details regarding the fixer composition and fixing agent are also described herein.

The corrugated print medium can include a printable ink-receiving layer including a porous coating with ink receiving capillaries from 1 nm to 70 nm. In one example, the pigment can be at least about 100 nm or more, and thus, can be filtered by the ink-receiving layer and stay on top of this printing layer. Even so, when the capillaries become crushed by burnishing, the pigment may not interact with the ink-receiving layer properly, and thus, may not adhere properly. Thus, the presence of the small concentration of dye in the ink, in some examples with partial water solubility and/or no more than one carboxylic acid group, can provide higher print quality in the burnished areas.

In another example, a method of printing can include applying a fixer composition on an ink-receiving layer of a corrugated print medium, wherein the fixer composition carries a fixing agent including from 3 wt % to 15 wt % divalent metal salt, and an aqueous fixer vehicle, and wherein the corrugated print medium includes a corrugated flute with peaks that support a printing substrate that is coated with the ink-receiving layer. The method can also include jetting an ink composition on the ink-receiving layer and in contact with the fixing agent. The ink composition can include from 2 wt % to 8 wt % pigment, from 0.1 wt % to 0.5 wt % dye, and from 2 wt % to 10 wt % polyurethane. Additional steps can include crashing the pigment and the polyurethane with the divalent metal salt on the ink-receiving layer, and allowing the dye to spread on the ink receiving layer while the pigment and the polyurethane are crashing.

This method is particularly useful with there are burnished areas on the corrugated print medium. In these examples, the ink-receiving layer may include unburnished portions and burnished portions generally over one or more of the peaks of the corrugated flute, and the unburnished portions and the burnished portions may have different surface tensions. Thus, the pigment and the dye can provide color to the unburnished portions, and the dye can primarily provide color to the burnished portions. In these examples, even though the pigment and the polyurethane may crash with the divalent metal salt in the burnished areas, collapsed capillaries may not be able to adequately absorb the ink. Thus, the added dye may not only help the optical density in the unburnished areas, because it can spread and absorb well in the burnished portions of the ink-receiving layer, even in the presence of the fixer composition (which includes a fixing agent of a divalent metal salt), it can provide cover for the poorly adhered fixed pigment and polyurethane at the burnished areas. As a note, some dye spreading in the ink can be positive as it relates to coverage. However, dyes that spread too much in water may not be good candidates for these inks, as they would feather or bleed too much, and not retain the crispness that may be desirable for commercial packaging.

In short, by adding a small amount, e.g., 0.1-0.5 wt %, of a dye to an aqueous pigmented ink for packaging, the burnished areas of the media can be masked, and the resulting print can appear more uniform and undamaged. The dyes can be selected based on the saturation and water fastness, so the print image provides the desired optical density, image quality, and durability. The dyes can also be selected to have appropriate spreading properties in the ink, e.g., they do not crash or at least do not crash significantly enough to prevent desirable spreading, and they do not spread too much so as to cause feathering and/or bleeding at the edge of the printed image. For example, the water fastness of the dyes, as characterized by the dyes water solubility, e.g., from 0.1 to 0.5 in water, can have an impact on the image quality and durability.

When discussing the ink sets, system, or methods as above or hereinafter, each of these discussions can be considered applicable to the other examples, whether or not they are explicitly discussed in the context of that example.

Thus, for example, in discussing a dye in the context of an ink set, such a dye can also be used in the system or method, whether or not mentioned explicitly in that example.

Turning to FIG. 1, a corrugated print medium 100 (shown inverted) can include a printing substrate 102 coated with an ink-receiving layer 104. The printing substrate can be any substrate suitable for printing and for use with packaging, including coated and uncoated media, e.g., paper media, nonporous media, swellable media, microporous media, photobase media, offset coated media, and other types of media including plastics, vinyl media, fabrics, woven substrate, etc. In certain examples, the substrate can be swellable media, microporous media, or offset media.

The ink-receiving layer 104, on the other hand, is typically applied to the printing substrate 102, and can include various ingredients which are combined in such a way to accept and receive ink. Often, there may be pores or capillaries in ink-receiving layer. Suitable ink-receiving layers can be prepared which include, for example, polymer binder, semi-metal oxide pigments, metal oxide pigments, calcium carbonate and/or titanium dioxide, water soluble styrene acrylic latex binder, etc. In one example, whiteness and gloss can be achieved by particle size and pigment mixture. The ink-receiving layer is shown is a single layer, but could be any of a number of layers, with the outermost layer being the layer where ink is applied. Additional over coating layers, such as varnishes or other protective coatings can be applied over the printed ink.

Methods that can be used to apply the ink-receiving layer 104 (or layers) on the printing substrate 102 generally include roll coating, slot-die coating, rod coating such as Mayer rod coating, blade coating, gravure coating, knife-over-roll coating, cascade coating, curtain coating, or the like. Generally the ink-receiving layer can be applied at a basis weight of 0.1 gsm to 30 gsm. In one example, the basis weight can be from 0.5 gsm to 10 gsm, and in one aspect, from 0.5 gsm to 5 gsm. As mentioned, the ink-receiving layer may be multiple layers, and thus, these ranges represent the ink-receiving layer thickness when a single layer, or the cumulative thickness of all of the layers when multiple layers are applied to the printing substrate. After printing, if an overcoat or varnish is applied to protect the printed image, it can be applied at from 0.5 gsm to 5 gsm, for example. Each of these coating weights is based on dry weight.

In further detail regarding FIG. 1, a corrugated flute 116 can support the printing substrate 102 and, indirectly, the ink-receiving layer 104. Specifically, the corrugated flute can include peaks 118 where the corrugated flute supports the printing substrate. On the other side of the corrugated flute, opposite the printing substrate, can be a base substrate 114 or backing that can also be attached to the corrugated flute. In this example, the corrugated print medium is shown being prepared between two plates, including a heating plate 120, which may apply heat and pressure to a printable side of the print medium, and a back plate 130, which also cooperates in applying pressure when preparing the corrugated packaging media. Under this heat and pressure, the corrugated packaging can be fused together as the media components are moved in direction (d) with respect to the heating plate and the back plate. As a result, an imaging side of the packaging (facing downward in this FIG.) can become scratched, burnished, or otherwise damaged, particularly just above the peaks of the corrugated flute.

Figure 2:
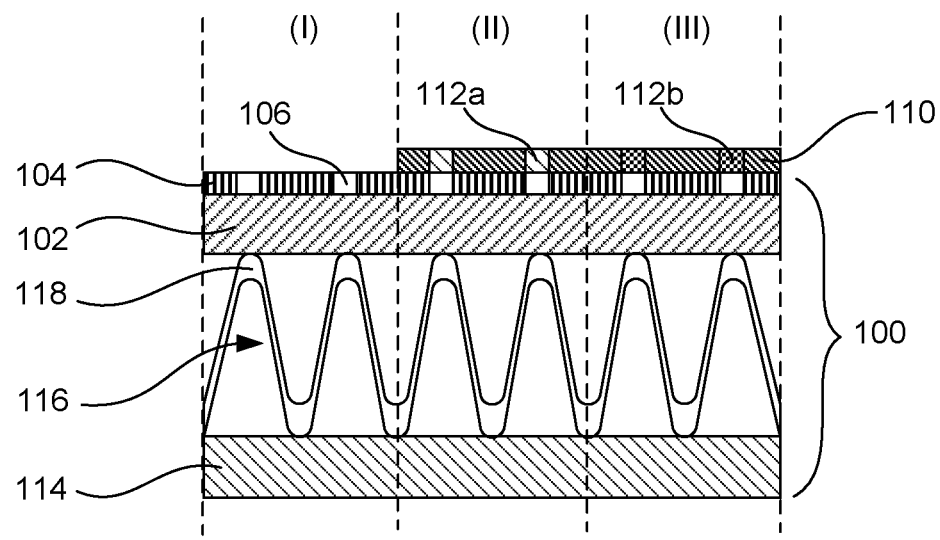
FIG. 2 depicts an example corrugated print medium including portions of an ink-receiving layer burnished by the corrugation process, and further showing portions where example inks are printed thereon in accordance with the present disclosure.

FIG. 2 shows the corrugated print medium 100 described above (flipped upright), but also shows the damaged or burnished portions 106 of the ink-receiving layer 104 just above the peaks 118 of the corrugated flute 116. The corrugated print medium also includes the base substrate 114 and the printing substrate 102 described previously. Also shown in FIG. 2 are three regions, (I), (II), and (III). Region (I) shows a portion of the corrugated print medium that has not been printed with ink. These areas may remain the color of the ink-receiving layer. Region (II) shows an ink composition 110 printed in contact with a fixing agent (applied using a fixing composition not shown but admixed with the ink composition to form the printed image) on the ink-receiving layer, both over 112a burnished areas 106 and in remaining areas that are not burnished 104. In Region (II), the ink does not include a dye, and thus, the ink composition, even when the pigment and polyurethane become crashed with the fixing agent, may not adhere to the ink-receiving layer over the burnished areas. This can leave a discoloration, or lack of appropriate coloration, in these regions. Region (II) shows an ink composition 110 printed in contact with a fixing agent on the ink-receiving layer, both over 112b burnished areas 106 and in remaining areas that are not burnished 110. In Region (III), the ink composition includes a dye in accordance with the present disclosure, and thus, the ink composition provides enough color, even over the burnished areas, that the coloration appears more uniform with acceptable coverage throughout.

Figure 3:
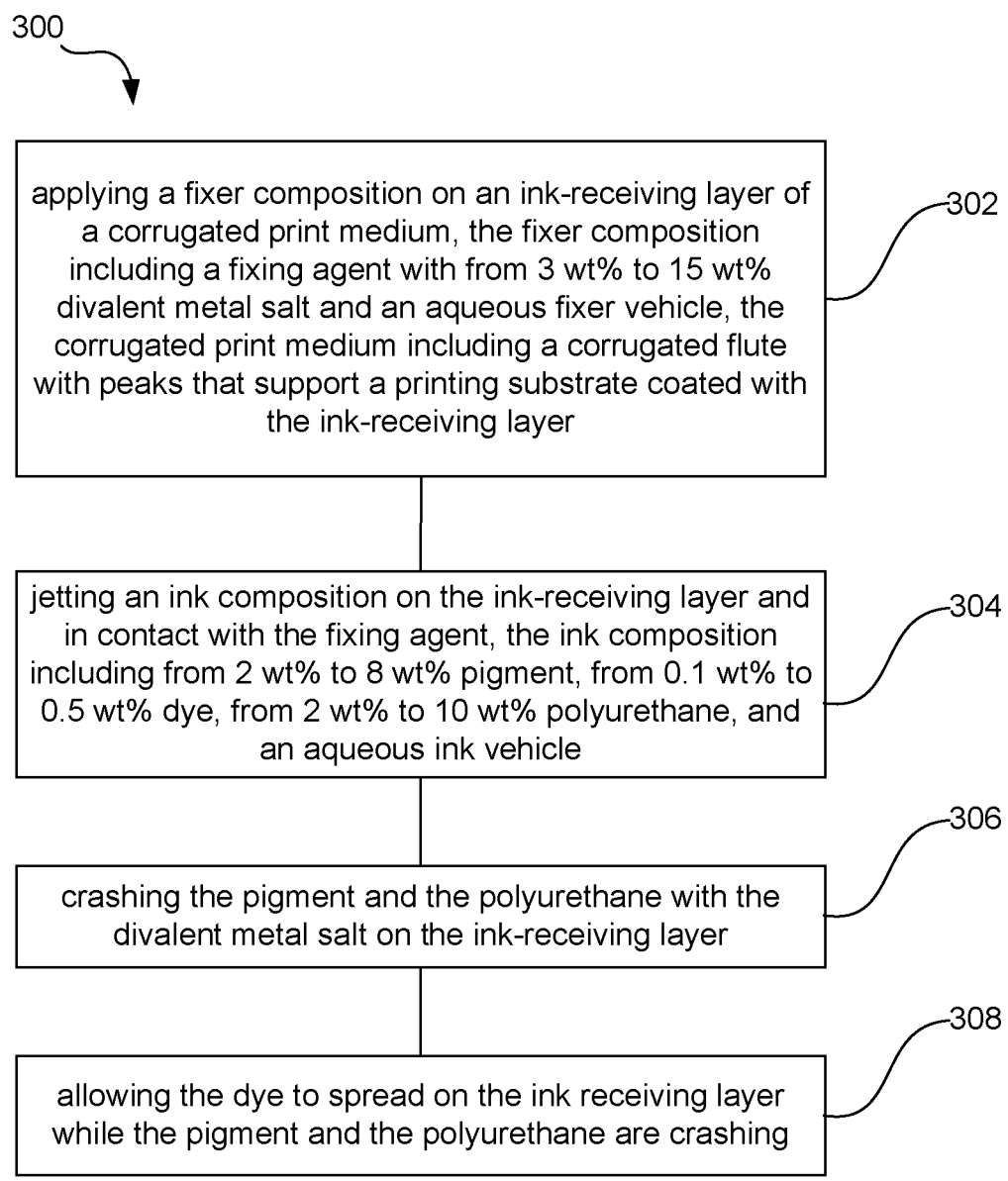
FIG. 3 depicts an example flow chart of a method in accordance with the present disclosure.

Referring to FIG. 3, a method 300 of printing, such as on corrugated print media, can include applying 302 a fixer composition on an ink-receiving layer of a corrugated print medium, and jetting 304 an ink composition on the ink-receiving layer and in contact with a fixing agent. The fixing composition is applied in the fixing composition. Thus, the fixer composition can include a fixing agent of from 3 wt % to 15 wt % divalent metal salt and an aqueous fixer vehicle, and the corrugated print medium can include a corrugated flute with peaks that support a printing substrate that is coated with the ink-receiving layer. The ink composition can include from 2 wt % to 8 wt % pigment, from 0.1 wt % to 0.5 wt % dye, and from 2 wt % to 10 wt % polyurethane. Additional steps can include crashing 306 the pigment and the polyurethane with the divalent metal salt on the ink-receiving layer, and allowing 308 the dye to spread on the ink receiving layer while the pigment and the polyurethane are crashing. As mentioned, this method can be particularly useful when there are burnished areas on the corrugated print medium. In these examples, the ink-receiving layer may include unburnished portions and burnished portions generally over one or more peak(s) of the corrugated flute, and the unburnished portions and the burnished portions may have different surface tensions. Thus, the pigment and the dye can provide color to the unburnished portions, and the dye can primarily provide color to the burnished portions.

Typical aqueous ink vehicle or aqueous fixer vehicle formulations described herein can include water and other ingredients, depending on the application method desired for use. For example, when jetting the ink or fixer, the formulation may include water as well as co-solvents present in total at from 0.1 wt % to 50 wt %, though amounts outside of this range can also be used. Further, surfactants can be present, ranging from 0.01 wt % to 10 wt %. The balance of the formulation can further include other vehicle components known in the art, such as biocides, viscosity modifiers, materials for pH adjustment, sequestering agents, preservatives, and the like. Typically, the aqueous ink vehicle can include water as a major solvent component. It is noted that the aqueous fixer fluid may be formulated for inkjet applications or for analog coating processes, and thus, the ingredients and concentrations for such different applications can vary widely. For example, a thicker slurry may be used for analog application, or a less viscous fluid may be used for digital application.

Apart from water, the aqueous ink vehicle or the aqueous fixer vehicle can include co-solvents and/or humectants such as aliphatic alcohols, aromatic alcohols, diols, glycol ethers, polyglycol ethers, 2-pyrrolidinones, caprolactams, formamides, acetamides, and long chain alcohols. Examples of such compounds include but are not limited to 2-pyrrolidinone and 2-methyl-1,3-propanediol. In one example, the aqueous ink vehicle may include a polyol co-solvent. The concentration range for solvents and/or humectants in the ink can be from 0.1 wt % to 50 wt %, depending on the print head jetting architecture, though amounts outside of this range can also be used.

Additional classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the aqueous ink and/or fixer composition(s) for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, and/or other additives to modify properties of the ink as desired. Such additives can be present at from 0.01 wt % to 20 wt %. Surfactants may also be included in the aqueous ink composition and/or the aqueous fixer composition.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate certain aspects of the ink sets, printing systems, and methods of the present disclosure. However, it is to be understood that the following examples are only illustrative of the present disclosure. Numerous modifications and alternatives may be devised by those skilled in the art without departing from the spirit and scope of the present disclosure. The appended claims are intended to cover such modifications and arrangements. Thus, while the above has been described with some particularity, the following examples provide further details.

Example 1—Ink Formulations

Three different inks compositions were prepared in accordance with Table 1, namely a black ink composition, a cyan ink composition, and a magenta ink composition.

TABLE 1

| Ingredients | Black Ink Composition (wt %) | Cyan Ink Composition (wt %) | Magenta Ink Composition (wt %) |
|---|---|---|---|
| Polyurethane | 5 | 5 | 5 |
| Tetraethylene Glycol | 3 | 3 | 3 |
| LEG-1 | 2 | 2 | 2 |
| Crodafos ™ O3A-LQ-(MH) from Croda | 0.5 | 0.5 | 0.5 |
| Polyethylene wax | 0.5 | 0.5 | 0.5 |
| Surfynol ® 440 from Air Products | 0.15 | 0.15 | 0.15 |
| Dynol ® 360 by Air Products | 0.15 | 0.15 | 0.15 |
| Black Pigment | 2.75 | — | — |
| Cyan Pigment | — | 2.25 | — |
| Magenta Pigment | — | — | 4 |
| Black Dye | 0, 0.1, 0.25, or 0.4 | — | — |
| Cyan Dye | — | 0, 0.1, 0.25, or 0.4 | — |
| Magenta Dye | — | — | 0, 0.1, 0.25, or 0.4 |

Example 2—Fixer Formulation

A fixer compositions was prepared in accordance with Table 2, as follows.

TABLE 2

| Ingredients | Fixer Composition (wt %) |
|---|---|
| Calcium Propionate | 2.8 |
| Calcium Nitrate-4H$_2$O | 8 |
| Surfynol ® SE-F from Air Products | 0.045 |
| Surfynol ® CT-211 From Air Products | 0.02 |
| Tiron (disodium 4,5-dihydroxy-1,3-benzenedisulfonate) | 0.095 |
| Tetraethylene glycol | 12 |
| Water | Balance |

Example 3—Printing on Burnished Areas of Corrugated Print Media

Corrugated print media with burnished areas of ink-receiving layer were printed using example black inks, cyan inks, and magenta inks prepared in accordance with Table 1. Prior to printing the various inks, each at four different dye concentrations (0 wt %, 0.1 wt %, 0.25 wt %, and 0.4 wt %), the fixer composition of Table 2 was applied to the ink-receiving layer at a 0.5-1.0 drop weight to fully cover the area to be printed. The inks compositions were then applied at a drop weight of 2.0 over at least the burnished areas.

In each case, for each color (black, cyan, and magenta), when there was no dye added, the ink composition and fixer composition were not suitable to mask the burnishing on the ink-receiving layer. There were many white areas (the color of the ink-receiving layer) showing through the printed ink and the print quality was unacceptable. For each ink composition, when just 0.1 wt % of the appropriately colored dye (matching the color of the pigment) was added to each of the colors (black, cyan, and magenta), a significant improvement was achieved, but there were still some white areas that did not get fully covered. For each ink composition, when formulated with 0.25 wt % dye, the visible white discolorations were no longer apparent and the print quality was good in the burnished area. At 0.4 wt % dye added to each of the inks, visible white discolorations were also no longer apparent, but these samples did not improve upon the print quality in the burnished areas. Thus, in this example, for all three colors, it was found that 0.25 wt % dye (and probably less, e.g., at a concentration between 0.1 wt % and 2.5 wt %) was sufficient to provide acceptable masking of burnished areas of the ink-receiving layer on the corrugated print media. At all concentrations tested, no negative Impact on image quality and durability was observed by adding dye to the ink in unburnished areas.

Example 4—Water Fastness

There are several dyes that can be effective in providing masking of burnished areas of an ink-receiving layer on a corrugated print medium. However, some dyes may spread unfavorably, e.g., too much, in an aqueous ink vehicle. Dyes that may otherwise be suitable for masking burnished areas can thus be tested for color spreading to determine if they are resistant enough to spreading on the ink-receiving layer to retain the image quality provided by the pigment fixer combination. Notably, some spreading and media absorption in the ink is a favorable property for masking, but excessive spreading in water to the extent it causes feathering and/or bleeding beyond the intended printed image can be problematic. In other words, though certain dyes can be effective for masking, in one example, a more controlled spreading profile, which can be quantified by water solubility to some extent, can provide a crisp look that approximates the print quality provided by the pigment and the fixer in unburnished areas.

To evaluate this, first an area fill stripe was printed with a pigment and dye containing ink, and the stripe was allowed to dry for 2-3 hours. Then, color spreading of nine specific dyes were evaluated by dripping 5-10 drops of water on the top of the printed area (printed ink has dye) to see if any of the various printed ink stripes could resist spreading to non-printed area or bleed to another color. Thus, water was dripped on the top of the printed area, and then was allowed to spread until the water evaporated or adsorbed to the media. Each sample was evaluated for spreading. In this visual test, a dye received a Pass if dye in the printed ink did not further spread/migrate, and received a Fail if the dye in the printed ink spread or migrated into another color. The nine dyes tested, and whether they passed or failed the spreading test, are provided in Table 3, as follows.

TABLE 3

| Dye | Pass or Fail |
|---|---|
| Direct Black 168 liquid | Pass |
| [1]Projet ™ Fast Black 2 liquid | Pass |
| Food Black 2 TMA liquid | Fail |
| [1]Projet ™ Cyan 1 Special | Pass |
| JPD Cyan H-CB liquid | Fail |
| [1]Projet ™ Cyan 854 liquid | Pass |
| [1]Projet ™ Magenta APD 1100 | Pass |
| Acid Red 289 TMA | Fail |
| [1]Projet ™ Fast Magenta 2 HI-NA | Pass |

[2]Projet is from FujiFIlm

While the present technology has been described with reference to certain examples, those skilled in the art will appreciate that various modifications, changes, omissions, and substitutions can be made without departing from the spirit of the disclosure. It is therefore intended that the disclosure be limited only by the scope of the appended claims.

What is claimed is:

1. An ink set, comprising:
    an ink composition, including:
        from 2 wt % to 8 wt % pigment,
        from 0.1 wt % to 0.5 wt % dye,
        from 2 wt % to 10 wt % polyurethane selected from a polyurea, a polyurethane with a curable double bond, or a polyurethane-graph polyol, and
        an aqueous ink vehicle; and
    a fixer composition, including:
        a fixing agent including from 3 wt % to 15 wt % divalent metal salt, and
        an aqueous fixer vehicle.

2. The ink set of claim 1, wherein the dye has 0 or 1 carboxylic acid group per dye molecule.

3. The ink set of claim 1, wherein the dye is a partially water soluble dye having a solubility from 1 g to 30 g per 100 mL of water at 25° C.

4. The ink set of claim 1, wherein the polyurethane has a weight average molecular weight ranging from 10,000 Mw to 100,000 Mw.

5. The ink set of claim 1, wherein the aqueous ink vehicle includes a polyol co-solvent.

6. The ink set of claim 1, wherein the pigment is present in the ink composition at from 2 wt % to 5 wt %, and the dye is the same color as the pigment and is present in the ink at from 0.2 wt % and 0.4 wt %.

7. The ink set of claim 1, wherein the fixing agent includes calcium propionate, calcium nitrate, calcium sulfate, magnesium propionate, magnesium nitrate, or magnesium sulfate.

8. A printing system, comprising:
- an ink composition, including from 2 wt % to 8 wt % pigment, from 0.1 wt % to 0.5 wt % dye, from 2 wt % to 10 wt % polyurethane selected from a polyurea, a polyurethane with a curable double bond, or a polyurethane-graph polyol, and an aqueous ink vehicle;
- a fixer composition, including a fixing agent including from 3 wt % to 15 wt % divalent metal salt, and an aqueous fixer vehicle; and
- a corrugated print medium including a corrugated flute with peaks that support a printing substrate coated with an ink-receiving layer.

9. The printing system of claim 8, wherein the dye is a partially water soluble dye having a solubility from 1 g to 30 g per 100 mL of water at 25° C., and wherein the dye includes 0 or 1 carboxylic acid group per dye molecule.

10. The printing system of claim 8, wherein the fixing agent includes calcium propionate, calcium nitrate, calcium sulfate, magnesium propionate, magnesium nitrate, or magnesium sulfate.

11. The printing system of claim 8, wherein the ink-receiving layer comprises a porous coating with ink receiving capillaries from 1 nm to 70 nm in width.

12. The printing system of claim 11, wherein the ink-receiving layer comprises burnished areas where a plurality of the ink-receiving capillaries are collapsed.

13. The printing system of claim 8, wherein the dye is present in the ink composition at from 0.2 wt % to 0.4 wt %, and the pigment is present in the ink composition at from 2 wt % to 5 wt %.

14. A method of printing, comprising:
- applying a fixer composition on an ink-receiving layer of a corrugated print medium, the fixer composition comprising a fixing agent including from 3 wt % to 15 wt % divalent metal salt and an aqueous fixer vehicle, the corrugated print medium comprising a corrugated flute with peaks that support a printing substrate coated with the ink-receiving layer;
- jetting an ink composition on the ink-receiving layer and in contact with the fixing agent, wherein the ink composition includes from 2 wt % to 8 wt % pigment, from 0.1 wt % to 0.5 wt % dye, from 2 wt % to 10 wt % polyurethane and an aqueous ink vehicle;
- crashing the pigment and the polyurethane with the divalent metal salt on the ink-receiving layer; and
- allowing the dye to spread on t ink receiving layer the pigment and the polyurethane are crashing.

15. The method of claim 14, wherein the ink-receiving layer includes unburnished portions and burnished portions generally over one or more of the peaks, wherein the unburnished portions and the burnished portions have different surface tensions, and wherein the pigment and the dye provide color to the unburnished portions and the dye primarily provides color to the burnished portions.

16. The method of claim 14, wherein the polyurethane is selected from a polyurea, a polyurethane with a curable double bond, or a polyurethane-graph polyol.

* * * * *